United States Patent [19]
Prillinger et al.

[11] 3,946,898
[45] Mar. 30, 1976

[54] STRAIN-LIMITING FASTENING APPARATUS

[75] Inventors: Peter F. M. Prillinger, Peoria Heights; Paul C. Rosenberger, Decatur, both of Ill.

[73] Assignee: Caterpillar Tractor Co., Peoria, Ill.

[22] Filed: Nov. 11, 1974

[21] Appl. No.: 522,389

[52] U.S. Cl. .................................................. 220/325
[51] Int. Cl.² ............................................ B65D 45/16
[58] Field of Search ............. 220/322, 324, 325, 327

[56] References Cited
UNITED STATES PATENTS

| | | | |
|---|---|---|---|
| 260,506 | 7/1882 | Hattersley | 220/325 |
| 714,296 | 11/1902 | Giesler | 220/325 |
| 1,367,683 | 2/1921 | Bentley | 220/325 |
| 1,511,610 | 10/1924 | Holmes | 220/325 |
| 1,521,093 | 12/1924 | Hall | 220/325 |
| 1,593,041 | 7/1926 | Stewart | 220/325 |
| 2,195,132 | 3/1940 | Nelson | 220/325 |
| 3,754,674 | 8/1973 | Wesoloski | 220/325 |
| 3,885,701 | 5/1975 | Becklin | 220/325 |

*Primary Examiner*—Ro E. Hart
*Attorney, Agent, or Firm*—Charles E. Lanchantin, Jr.

[57] ABSTRACT

A strain-limiting fastening apparatus for containing a source of potential energy in entrapped relation between a pair of axially separable members includes a plurality of fasteners securable to one of the members for substantially axially holding the other member thereto in opposition to the source of potential energy, and a plurality of stops on the other member for limiting the degree of maximum axial adjustment of an individual fastener to a predetermined incremental amount until all of the fasteners have been adjusted to this amount, to thereby limit the degree of cocking of the other member during the assembly or disassembly thereof in order to minimize unequal loading of the fasteners by the source of potential energy.

12 Claims, 4 Drawing Figures

STRAIN-LIMITING FASTENING APPARATUS

BACKGROUND OF THE INVENTION

Assembling and disassembling energy storage devices, such as pressurized fluid accumulators, spring-loaded pistons and the like, can be a potentially hazardous operation. Normally, a plurality of fasteners loadably secure a cover or end plate against a housing to thus contain the potential energy stored within the housing. During the installation or removal of the cover, however, the fasteners are not always uncoupled in proper sequence or to the proper degree with the result that the stored energy tends to transversely cock the cover relative to a central longitudinal axis of the storage device and to thereby excessively load one or more of the fasteners causing them to fail. Such unlimited cocking of the cover can then result in a catastrophic sequential failure of the remaining fasteners until they and the cover are propelled outwardly from the housing as missiles with such a force as to create a serious hazard to any person or other object in their path.

SUMMARY OF OBJECTS OF THE INVENTION

It is therefore an object of the present invention to provide a strain-limiting fastening apparatus for containing the potential energy stored in an energy storage device which will assure relatively more uniform loading of the fasteners during assembly or disassembly of such storage device.

Another object of the present invention is to provide such an improved strain-limiting fastening apparatus able to positively limit the degree of adjustment of an individual fastener to a predetermined incremental amount until all of the fasteners have been adjusted to such amount to assure sequentially stepped and limited loading of the fasteners.

Another object of the present invention is to provide a strain-limiting fastening apparatus of the character described which is both simple in construction and operation and manipulatable by conventional tools.

Other objects and advantages of the present invention will become more readily apparent upon reference to the accompanying drawings and the following description.

DESCRIPTION OF THE PREFERRED EMBODIMENT

Figure 1:
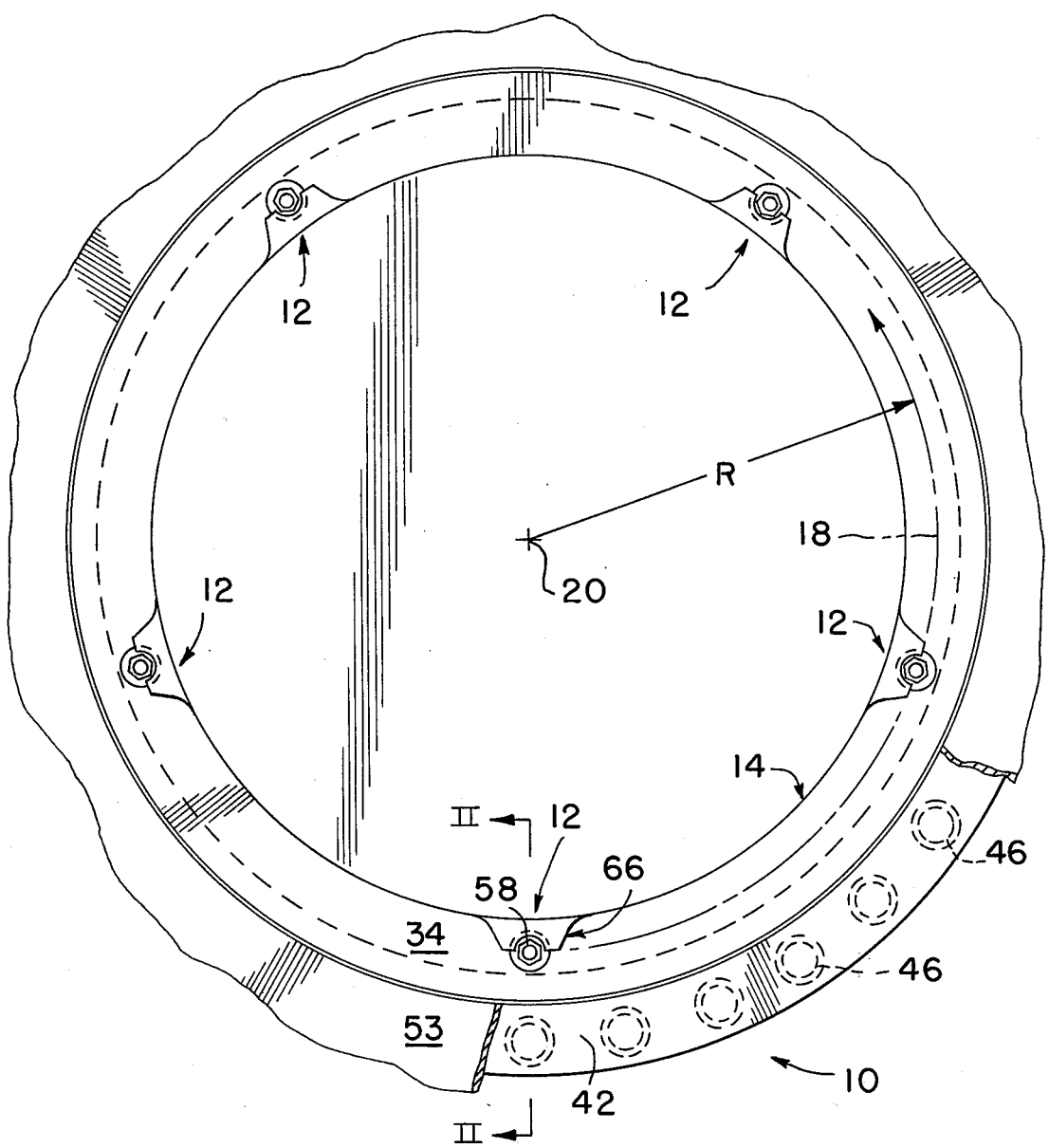
FIG. 1 is an end elevational view of an energy storage device incorporating a strain-limiting fastening apparatus of the present invention.
Figure 2:
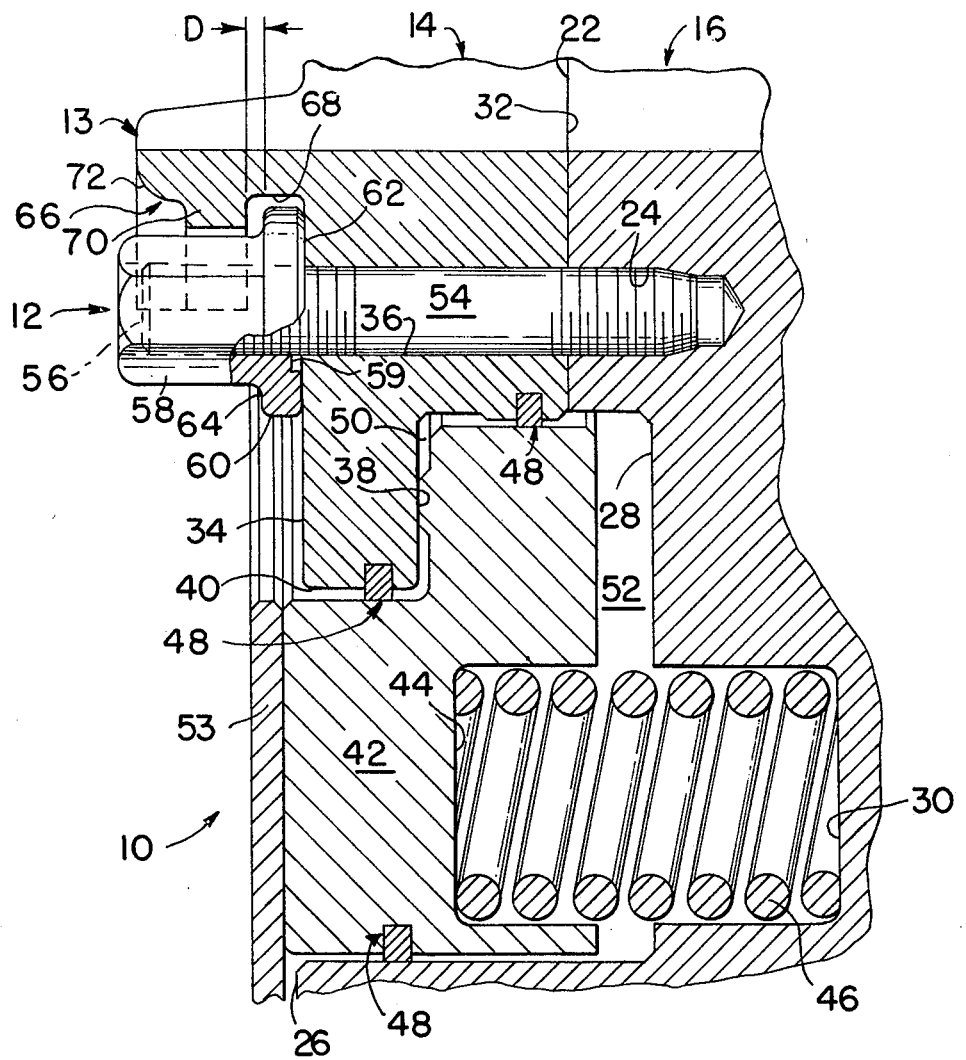
FIG. 2 is a somewhat enlarged fragmentary section through the energy storage device and strain-limiting fastening apparatus taken along the line II—II of FIG. 1.

Referring to FIGS. 1 and 2, the strain-limiting fastening apparatus 10 of the present invention includes a plurality of fasteners 12 for containing the potential energy stored in an energy storage device 13. The energy storage device provides a pair of axially separable annular members, such as a removable cover plate 14 and a housing 16 which are held in tightly clamped relation by the peripherally located fasteners. The fasteners are generally disposed in substantially equally circumferential spaced relation on a common bolt pitch circle 18. Such pitch circle has a relatively large radius R in the instant example, of approximately 16 inches (40.6 cm), from a central longitudinal axis 20.

The annular housing 16 has an annular end face 22 disposed in a plane substantially perpendicular to the central axis 20 and has a plurality of circumferentially spaced screwthreaded bores 24. An annular radially outwardly disposed end face 26 is located in a plane axially offset to the left, when viewed in FIG. 2, of the end face 22 and serves to define therebetween an annular piston-receiving pocket 28 in the housing. Further, a plurality of circumferentially spaced cylindrical spring-receiving cavities 30 are disposed in the housing in communication with the pocket.

The annular cover plate 14 includes an inner end face 32 normally disposed in intimately facing engagement against the end face 22 of the housing 16. The cover also has an opposite axially offset outer end face 34 with a plurality of through bores 36 extending between the opposite end faces. An axially inwardly facing annular step 38 is also formed in the cover between the end face 32 and a radially outer peripheral surface 40 in order to retain a spring-actuated, hydraulically retracted annular piston 42 thereon. This piston has a plurality of spring-receiving cavities 44 therein, which are aligned in opposing relation to the cavities 30 in the housing. These opposing cavities individually receive a relatively high capacity compression spring 46 therebetween to urge the piston outwardly or to the left when viewed in FIG. 2, with a relatively high force against the step 38. Thus, the compressed springs 46 collectively act as a source of potential energy substantially entrapped between the cover 14 and the housing 16.

Three piston ring seal arrangements, identified generally by the reference numerals 48, encircle the cover 14 and the annular piston 42 to provide a sealed fluid-receiving, piston-retracting chamber 50 and a sealed spring chamber 52. Such energy storage device 13 and its axially movable piston finds particular utility in vehicle braking arrangements, wherein pressurized fluid from a suitable source (not shown) is directed to the chamber 50 to move the annular piston rightwardly of the position shown in FIG. 2 in opposition to the load of the springs 46. Thereafter, upon release of the pressurized fluid from the chamber 50 the piston is urged leftwardly by the springs to be engaged against an external element 53 whose relative rotary motion is to be braked, all in a well known manner.

Each of the fasteners 12 includes a threaded stud 54 screwthreadably anchored in one of the bores 24 of the housing 16 in substantially parallel relation to the central axis 20. Each stud extends axially outwardly and relatively loosely through one of the bores 36 in the cover 14 to terminate at a distal end 56. An axially elongated, internally threaded hexagonal nut 58 is then screwthreadably mounted on each stud. Each of these nuts has an inwardly facing relatively smooth counterbore 59 and a radially outwardly extending flange 60 thereon which provide an annular end face 62 for abutting engagement against the outer end face 34 of the cover, and an opposite annular shoulder 64 for purposes hereinafter to be described.

Figure 3:
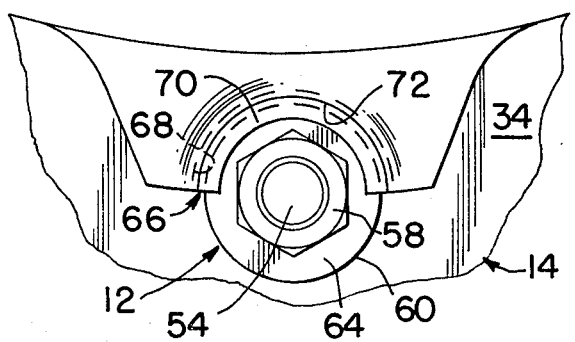
FIG. 3 is an enlarged fragmentary end elevational view of the strain-limiting fastening apparatus of the present invention to better show details of one of the individual fasteners shown in FIG. 1.

As best shown in FIGS. 2 and 3, the annular cover plate 14 further includes a plurality of circumferentially spaced protuberances or stop elements identified generally by the reference numeral 66, which extend axially outwardly from the end face 34 in individually aligned relation to the fasteners 12. Each of these stop elements has an arcuate saddle portion formed by a semicircular inner groove 68, a semicircular central wall 70, and a semicircular outer recessed pocket portion 72. The hexagonal nut 58 associated with each of these stop elements is thus disposed in a generally protected relation by the pocket portion, with the central wall partially embracing it, and with its flange 60 extending into the inner groove. With this arrangement the flange of the nut is substantially trapped in the groove so that loosening of each nut in any sequence is limited to a predetermined distance D as noted in FIG. 2, whereupon the shoulder 64 contacts the central wall 70 of the stop. The unloosened remaining nuts thereafter serve to retain the potential energy of the compression springs 46, until a number of the nuts are loosened on a significant portion of the bolt circle 18 so that the cover plate 14 is limitedly cocked outwardly to establish abutting contact of the end face 34 with the axially outwardly disposed nut end faces 62. Thus, the present invention materially decreases the bending action or strain on the diagonally opposite and unloosed fasteners 12 by restricting the degree of transverse angular cocking of the cover plate by the stored energy during the assembly or disassembly thereof, which results in a safer fastening apparatus.

OPERATION

While the operation of the present invention is believed clearly apparent from the foregoing description, further amplification will subsequently be made in the following brief summary of such operation. During the initial assembly of the strain-limiting fastening apparatus 10, the compression springs 46 are extended to their free length, the cover plate 14 is mounted in spaced-apart relation from the housing 16 on the studs 54 with their distal ends 56 protruding a short distance outwardly of the end face 34 of the cover plate. The nuts 58 are individually hung by their counterbores 29 on the ends of the studs with their flanges 60 extending loosely into the grooves 68 in cocked relation to assure against inadvertent separation during this initial assembly procedure and to permit horizontal assembly thereof by one man. It is significant that the counterbore in the nuts is of a sufficient diameter and depth to accommodate variations in the amount of stud extension due to manufacturing variations and the like without binding or restricting entry of the nut flanges into the cover grooves or their subsequent rotation onto the screwthreaded portion of the studs.

At this stage the nuts 58 are conveniently externally engaged by a conventional wrench (not shown) and the nuts are screwthreaded axially inwardly on the studs 54 in any preferred sequence. With each nut disposed in starting screwthreaded engagement with its respective stud, further rotation of the first selected nut and axial inward movement of the cover plate 14 is limited to the predetermined maximum incremental amount identified as D in FIG. 2. This is because prior to inward movement of the last nut in the sequence, its shoulder 64 is in abutting contact with the central wall 70 so that the cover plate is held outwardly relative to the housing 16, while the remaining nuts have their end faces 62 engaged against the end face 34 of the cover. Upon continued inward advancement of the last nut in the sequence beyond the distance D, it will pick up the load of the compression springs 46 on the cover and its travel is thereafter limited to substantially a second incremental amount equivalent to distance D by the remaining nuts contacting the stop elements 66. This circular installation sequence is repeated and the loading of the fasteners gradually increases with the axial movement of the cover on the studs towards the housing, and thereby establishing increased compression of the springs.

Upon reaching the assembly point of the last distance D between the end faces 22 and 32, the last nut 58 in the series to be screwthreadably tightened picks up the largest part of the load of the substantially fully compressed springs 46, thereby representing the most severely loaded condition. With contact of the end faces 22 and 32 adjacent the fully installed nut, the cover plate 14 is deflected axially outwardly by the stored energy a distance D diagonally opposite thereto. However, the stop elements 66 limit such transverse cocking of the cover plate relative to the central longitudinal axis 20 to an angle approximately proportional to the ratio of the predetermined distance D and the bolt pitch circle diameter 2R, or one-eighth inch to 32 inches in the instant example, which is equivalent to only 0.2°. This angularity is not sufficient to cause any significant degree of rubbing contact between the diagonally opposite studs 54 and the bores 36, since the usual clearance provided therebetween for reasons of manufacturing tolerances and ease of assembly is relatively substantial. Such limited degree of cocking of the cover plate is in marked contrast to conventional fastening methods which do not positively impose any limit on the tightening or loosening of an individual fastener. In this way the last nut and stud is able to withstand the relatively more limited bending due to the prying or leverage action of the cocked cover plate with greater safety to personnel in the area. Further, even if the last stud fails the movement of the cover plate would substantially be limited to the distance D and this would also restrict the maximum rate of acceleration of the cover at the time of its impacting contact with the remaining fasteners.

In much the same manner, the nuts 58 of the fasteners 12 may be sequentially screwthreadably loosened from their respective studs 54 to gradually allow the axially outward movement of the cover plate 14 from the housing 16 and release of the load of the compression springs 46. All nuts but the last to be loosened are limited in travel by the stop elements 66 to the distance D, and upon axial outward movement of the last nut a second incremental distance D the cycle may be repeated. Progressive release of the energy in the storage device 13 thus continues until the energy in the compression springs is completely released. This is assured by allowing the springs to reach their free length prior to disengagement of the nuts on the studs.

SECOND EMBODIMENT

Figure 4:
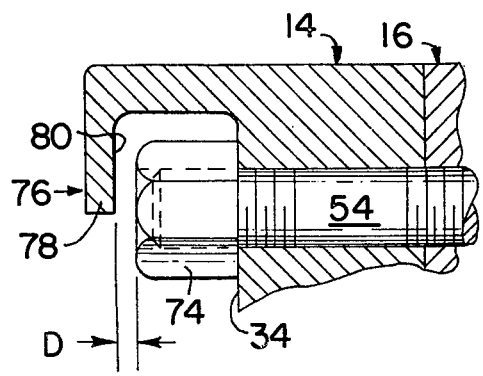
FIG. 4 is a fragmentary sectional view of a second embodiment of the strain-limiting fastening apparatus of the present invention.

A second embodiment of the strain-limiting fastening apparatus 10 of the present invention is shown in FIG. 4, wherein similar reference numerals corresponding to those discussed above have been applied. In this embodiment, however, screwthreaded movement of a hexagonal nut 74 is limited by a plurality of modified stop elements 76 integrally formed on the cover plate 14. Each of the stop elements has a radially outwardly extending tang 78 with an inner end face 80 thereon which is disposed in limited endward blocking relation to the nut at a predetermined distance D, corresponding to that previously described, plus the axial length of the nut from the end face 34. Such modified stop elements thereby limit the degree of maximum axial adjustment of any one of the nuts 74 until all of the remaining nuts have been adjusted to such an amount substantially as described above. While being simpler in construction than the first embodiment, the second embodiment restricts free access to the nuts by conventional wrenches to a greater extent than the first embodiment.

Thus it may be appreciated that the strain-limiting fastening apparatus 10 of the present invention assures relatively uniform loading of the fasteners used to secure a cover plate to the housing of an energy storage device in opposition to the potential energy stored therein. It features a cover plate with a plurality of stops for positively limiting the maximum degree of adjustment of any individual fastener to a predetermined incremental amount until all of such fasteners have been adjusted to such amount to assure relatively sequentially stepped loading of the fasteners.

It is also apparent that the strain-limiting fastening apparatus of the present invention teaches improved progressive relief of energy in a storage device regardless of the skill of those disassembling the fasteners thereof, as the cover plate may be substantially unloaded by the energy contained in the storage device prior to complete disassembly of the fasteners.

While the invention has been described and shown with particular reference to a preferred and second embodiment, it will be apparent that other variations might be possible that would fall within the scope of the present invention, which is not intended to be limited except as defined in the following claims.

The embodiments of the invention in which an exclusive property or privilege is claimed are defined as follows:

1. A strain-limiting fastening apparatus, for containing a source of potential energy entrapped between a pair of axially separable members, comprising;
   a plurality of fasteners securable to one of such separable members for substantially axially holding the other member thereto in opposition to the source of potential energy; and
   means on said other member and cooperating with each of said fasteners for limiting the maximum axial adjustment of an individual fastener relative to said other member to a predetermined incremental amount which is less than the axial adjustment of said fastener relative to said one member necessary for full assembly or disassembly of said members.

2. The strain-limiting fastening apparatus of claim 1 wherein said means includes a plurality of stop elements secured to said other member and individually disposed in entrapping relation to said fasteners.

3. A strain-limiting fastening apparatus, for an energy storage device having a housing and a removable cover plate adaptable to axially contain a source of potential energy entrapped therebetween, comprising;
   a plurality of fasteners screwthreadably securable to the housing for substantially axially holding such removable cover plate thereto in opposition to the source of potential energy; and
   a plurality of stop elements on said cover plate for assuring screwthreaded positioning of all of said fasteners a predetermined axial incremental distance prior to enabling further screwthreaded movement thereof so that said energy is progressively contained between said removable cover plate and said housing during the assembly and disassembly thereof with relatively limited cocking of said removable cover plate and thereby assuring relatively uniform loading of said fasteners.

4. The strain-limiting fastening apparatus of claim 3 wherein each of said stop elements includes a radially extending tang which is disposed in limited endward blocking relation to an associated one of said fasteners.

5. The strain-limiting fastening apparatus of claim 3 wherein said plurality of stop elements are secured to said removable cover plate in individual limitingly axially entrapping relation to said fasteners.

6. The strain-limiting fastening apparatus of claim 5 wherein the housing has a central longitudinal axis, and wherein said housing and said removable cover plate are annular members centrally disposed on said axis, and said fasteners are substantially equally circumferentially spaced on a pitch circle common with said axis and are parallel thereto.

7. The strain-limiting fastening apparatus of claim 6 wherein said stop elements are substantially semicircularly shaped including an inner groove therein, and said fasteners individually include a threaded stud secured to said housing and a nut screwthreadably mounted thereon, said nut having a radially outwardly extending flange disposed in generally entrapped relation in said groove.

8. A strain-limiting fastening apparatus comprising;
   a central longitudinal axis;
   a housing arranged circularly about said axis and having an axially outer end surface transverse to said axis;
   a cover plate arranged circularly about said axis and having an axially inner end surface thereon engageable with said outer surface of said housing;
   a source of potential energy tending to axially separate said housing and said cover plate;
   a plurality of fasteners screwthreadably secured to the housing in generally equally circumferentially spaced relation to said axis for holding said cover plate to the housing in opposition to said source of potential energy; and
   a plurality of stop elements on said cover plate for assuring screwthreaded positioning of all of said fasteners a predetermined axial incremental distance prior to enabling further screwthreaded movement of any one of said fasteners so that transverse cocking of said cover plate relative to said axis by said source of potential energy is limited to thereby assure uniform loading of said fasteners during the assembly or disassembly of said cover plate.

9. The strain-limiting fastening apparatus of claim 8 wherein each of said fasteners includes a threaded stud anchored to said housing and a nut screwthreadably engaged on the stud, and wherein said nut is substantially limitedly axially entrapped by one of said plurality of stop elements.

10. The strain-limiting fastening apparatus of claim 9 wherein each of said nuts has a radially extending flange thereon and each of said stop elements includes a semicircular central wall relatively closely embracing the nut and a semicircular inner groove adjacent thereto for substantially entrapping said flange.

11. The strain-limiting fastening apparatus of claim 10 wherein each of said stop elements further includes a semicircular recessed pocket portion therein providing substantially unrestricted accessibility to said nut while serving to protect said nut.

12. The strain-limiting fastening apparatus of claim 10 wherein each of said nuts has an axially inwardly facing counterbore therein for initial centering and holding engagement of said nut on said stud.

* * * * *